United States Patent
Gardner et al.

(10) Patent No.: US 9,103,953 B2
(45) Date of Patent: Aug. 11, 2015

(54) OFF-AXIS ILLUMINATION LED LUMINAIRE

(75) Inventors: Robert C. Gardner, Atherton, CA (US);
Christopher H. Lowery, Tracy, CA (US)

(73) Assignee: Lunera Lighting Inc., Santa Clara, CA (US)

( * ) Notice: Subject to any disclaimer, the term of this patent is extended or adjusted under 35 U.S.C. 154(b) by 440 days.

(21) Appl. No.: 12/983,787

(22) Filed: Jan. 3, 2011

(65) Prior Publication Data

US 2012/0170260 A1 Jul. 5, 2012

(51) Int. Cl.
*F21V 7/04* (2006.01)
*F21V 8/00* (2006.01)

(52) U.S. Cl.
CPC .............. *G02B 6/0045* (2013.01); *G02B 6/002* (2013.01); *G02B 6/0038* (2013.01)

(58) Field of Classification Search
CPC .... G02B 6/0028; G02B 6/0011; G02B 6/002; G02B 6/0075; G02B 6/4214; G02F 1/133615; Y10S 385/901; Y10T 29/49716
USPC ............ 362/26, 27, 29, 30, 249.01, 234–237, 362/244, 245, 249.02, 326, 327, 511, 540, 362/542, 559, 601, 800, 23.16, 23.2, 253, 362/330, 490, 509, 520–523, 555, 560, 362/602–627; 385/40, 50, 51, 39, 41, 42, 385/47, 129, 130, 901
See application file for complete search history.

(56) References Cited

U.S. PATENT DOCUMENTS

| | | | | |
|---|---|---|---|---|
| 4,017,155 A * | 4/1977 | Yagi et al. | ........................ | 349/65 |
| 4,105,293 A * | 8/1978 | Aizenberg et al. | ............. | 359/597 |
| 5,921,652 A * | 7/1999 | Parker et al. | ................... | 362/601 |
| 6,332,690 B1 * | 12/2001 | Murofushi | ..................... | 362/611 |
| 6,350,050 B1 * | 2/2002 | Buelow et al. | ................. | 362/551 |
| 6,561,665 B1 * | 5/2003 | Kim | ............................... | 362/604 |
| 6,796,700 B2 * | 9/2004 | Kraft | .............................. | 362/560 |
| 7,134,768 B2 * | 11/2006 | Suzuki | ......................... | 362/241 |
| 7,188,989 B2 * | 3/2007 | Miyashita | ..................... | 362/621 |
| 7,682,062 B2 * | 3/2010 | Stadtwald-Klenke | ........ | 362/612 |
| 7,878,686 B2 * | 2/2011 | Suehiro et al. | ................. | 362/294 |
| 8,292,480 B2 * | 10/2012 | Koizumi et al. | ............... | 362/545 |
| 8,322,902 B2 * | 12/2012 | Martin et al. | .................. | 362/511 |
| 8,430,517 B2 * | 4/2013 | Tortora | ...................... | 362/23.09 |
| 2005/0100288 A1 * | 5/2005 | Chu | ................................. | 385/88 |
| 2008/0260329 A1 * | 10/2008 | Epstein | ........................... | 385/32 |
| 2010/0028991 A1 * | 2/2010 | McCall | ...................... | 435/292.1 |
| 2010/0195349 A1 * | 8/2010 | Kanade et al. | ................. | 362/607 |
| 2011/0007506 A1 * | 1/2011 | Kinoshita | ...................... | 362/235 |
| 2012/0098794 A1 * | 4/2012 | Kleinert et al. | ............... | 345/175 |

* cited by examiner

*Primary Examiner* — Hargobind S Sawhney
(74) *Attorney, Agent, or Firm* — North Weber & Baugh LLP

(57) ABSTRACT

This is directed to a LED light fixture having a shaped light guide array with a CPC reflector for directing light off-axis, and methods for constructing the same. A LED light fixture includes a LED module providing light and an elongated light guide array placed adjacent to the LED module. The elongated light guide array can include a curved outer surface through which light is emitted into an environment. To further control the output of light, and to direct light off-axis, the light guide array can include a CPC reflector disposed around a boundary or periphery of the light guide array. The CPC reflector can be angled such that light is directed at angles above a cut-off angle by which the reflector is rotated about a focus.

20 Claims, 5 Drawing Sheets

OFF-AXIS ILLUMINATION LED LUMINAIRE

BACKGROUND

Light fixtures provide a source of light to illuminate dark environments. A light fixture can be constructed from a light source placed in contact with a light guide for directing light from the light source into an environment. To improve the efficiency of the light fixture, and to reduce costs associated with illumination, a light emitting diode (LED) module can be used as a light source. A LED module, however, emits light that must be re-directed off an axis of the LED module to provide sufficient uniform illumination for a dark environment, such as a garage.

SUMMARY

An edge-lit LED-based light fixtures having a shaped light guide array with a compound parabolic concentrator (CPC) reflector and methods for creating the same are provided. In particular, a light fixture can include a LED light source connected to one end of an elongated and curved light guide array such that light emitted by the LED light source can be frustrated out of the light guide array at different angles to provide uniform luminance. In some cases, the light guide array can incorporate a CPC reflector to redirect a portion of the light flux emitted by the LED light source.

A LED light fixture can include a LED module serving as a light source. To guide the light towards an environment, a light guide array (LGA) can be coupled to the light source such that light from the light source can be redirected towards the environment in a substantially Lambertian distribution. In particular, the LGA can include ribs or other features for frustrating light out of the LGA and into the environment of the fixture.

In some cases, however, it may be desirable for the illumination provided by the LED light fixture to be modified and directed off of the axis of the LED light fixture. In such cases, the LGA can be shaped to include curved surfaces that extend across several different planes. In this manner, light frustrated by the LGA can be redirected at a variety of angles relative to an axis of the LGA to more uniformly illuminate an environment.

To further enhance the illumination pattern provided by the fixture, the LGA can include a CPC reflector incorporated on top of the LGA. The CPC reflector can include a parabolic feature or structure forming a secondary reflective surface that can redirect some of the light emitted by the LED module to an off-axis elevation and azimuth of a desired specification. The position and size of the parabolic features can be selected based on a desired cut-off angle at which off-axis light is directed, and the amount of light flux to be redirected by the parabolic surface or by other features of the LGA. In some cases, features within the light guide can be distributed in different densities to further control the frustration of light in the LGA so as to coordinate with the desired reflection characteristics of the CPC.

BRIEF DESCRIPTION OF THE DRAWINGS

The above and other features of the present invention, its nature and various advantages will be more apparent upon consideration of the following detailed description, taken in conjunction with the accompanying drawings in which.

DETAILED DESCRIPTION

This is directed to an edge-lit LED light fixture having an elongated light guide array (LGA) to which a LED light source is coupled at a first end. The LGA can be curved such that a surface of the LGA extends over several planes. In some cases, the LGA can include a CPC reflector for further changing an orientation at which light is emitted by the LGA.

Figure 1:
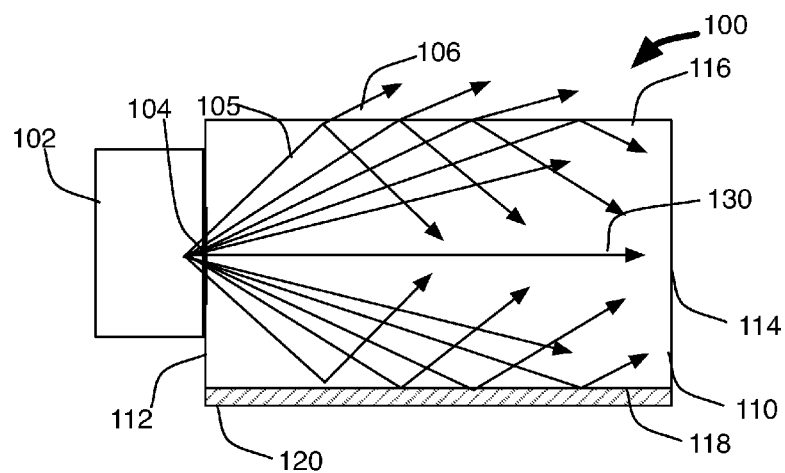
FIG. 1 is a side view of an illustrative light fixture in accordance with some embodiments of the invention.

A light fixture that uses a LED module as a light source can be mounted in several different manners. In some cases, a light fixture can be mounted to a ceiling, mounted under a counter, as part of a desk light, as a wall sconce, as a wall wash, as a surface mounted light fixture, or combinations of these. Light emitted by the LED module can be directed into the environment from the fixture by a light guide array (LGA). FIG. 1 is a side view of an illustrative light fixture in accordance with some embodiments of the invention. Fixture 100 can include LED module 102 providing light from light emitting surface 104. Emitted light 105 propagates through light guide array 110 (LGA 110) positioned adjacent to LED module 102. LGA 110 can include an extended structure defined such that light provided into the LGA is directed into the environment through one surface of the LGA. For example, LGA 110 can include an elongated body such that light is directed out of top boundary 116 of LGA 110, but not out of bottom boundary 118 of LGA 110.

LED module 102 can provide light to LGA 110 using different approaches. In particular, LED module 102 may be placed in contact with or adjacent to first end 112 of LGA 110 such that light enters LGA 110 from first end 112 and is propagated towards second end 114. Light 105 entering LGA 110 can be reflected (e.g., totally internally reflected) in part by upper boundary 116 and lower boundary 118. In some cases, reflective component 120 (e.g., a separate reflective element offset from lower boundary 118) can be applied to or near lower boundary 118 to reflects back scatter off frustration features of surface 116 and reduce losses of light leaving LGA 110 through lower boundary 118. Some portions 106 of light 105, however, may be frustrated by ribs or other features incorporated in LGA 110, such that portions 106 of light 105 leave LGA 110 through upper boundary 116. These portions 106 may serve to illuminate the environment in which fixture 100 is placed. Portions 106 can exit LGA 110 at any angle relative to axis 130 of LED module 102 including, for example, at an angle substantially perpendicular to axis 130. In some cases, however, the angle may be determined from features within LGA 110 for frustrating light, from the material of LGA 110, or combinations of these.

LGA 110 can include any suitable waveguide for guiding light waves from a source into an environment. In some cases, LGA 110 can include a slab or planar waveguide, a rib waveguide, or any other type of waveguide. In some cases, LGA 110 can include several guides combining to redirect light from a LED module.

LGA 110 can have any suitable size or shape. In some cases, the size and shape used for a particular LGA can vary based on the desired use of a light fixture. For example, LGA 110 can substantially define a rectangular prism having sides that are constrained within planes. Adjacent sides of the LGA can be provided at substantially right angles. The rectangular prism can have any suitable dimensions including, for example, a height of 150 mm (e.g., 6"), a width of 5 mm (e.g., 0.2") and a length in the range of 300 mm to 2500 mm (e.g., 1' to 8'). In some cases, LGA 110 can include a non-rectangular three-dimensional shape. For example, LGA 110 can include a triangular prism, or any other non-rectangular polygonal prism.

Figure 2:
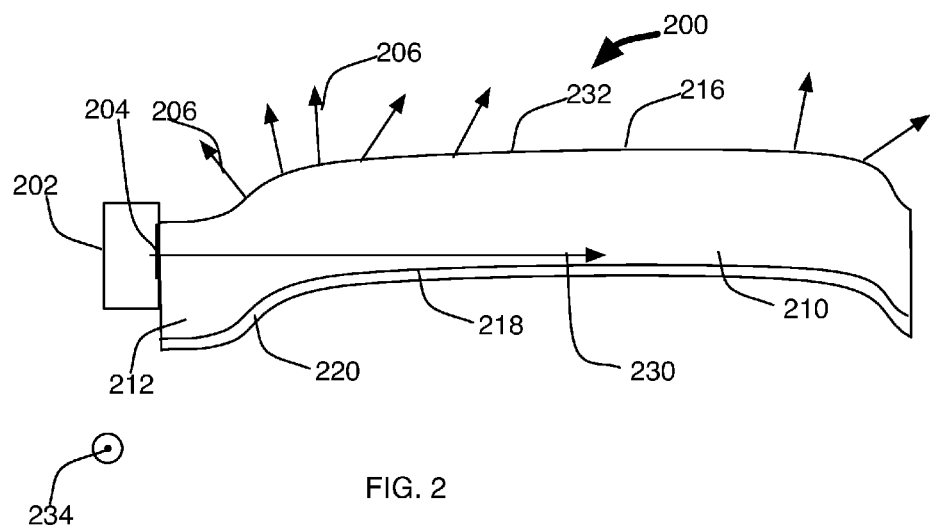
FIG. 2 is a side view of a shaped light fixture in accordance with some embodiments of the invention.

Some environments, such as garages, may require a light fixture that provides light off-axis in a uniform manner. For such uses, a rectangular prism-shaped LGA may not re-direct light in a sufficiently uniform manner. Instead, it may be desirable for the LGA to be shaped such that an elongated surface of the LGA is curved and extends over several planes. In particular, the LGA may be shaped such that a section of the LGA defines a spline. FIG. 2 is a side view of a shaped light fixture in accordance with some embodiments of the invention. Light fixture 200 can include LED module 202 and LGA 210 having some or all of the features of light fixture 100 (FIG. 1). LGA 210 can include a base structure having first end 212 adjacent to source 204 of LED module 202, upper boundary 216 through which light may escape LGA 210, and lower boundary 218 adjacent to which reflecting component 220 is placed.

In contrast with the light guide of fixture 100, however, LGA 210 may define curved boundary 216, such that light 206 frustrated by features (eg, ribs) on LGA 210 is emitted at different angles relative to axis 230 of LED module 202. The shape of LGA 210 can be customized for a particular environment, such that the distribution and angles of light 206 corresponds to different regions of the environment. In some cases, the shape of LGA 210 can be defined as a spline that is projected along a vector to create a surface. For example, spline 232 can be projected along axis 234 to create a surface at boundary 216 of LGA 210. In some cases, upper boundary 216 and lower boundary 218 may be substantially parallel to provide boundaries for rays that are not frustrated by surface features of LGA 210.

Figure 3:
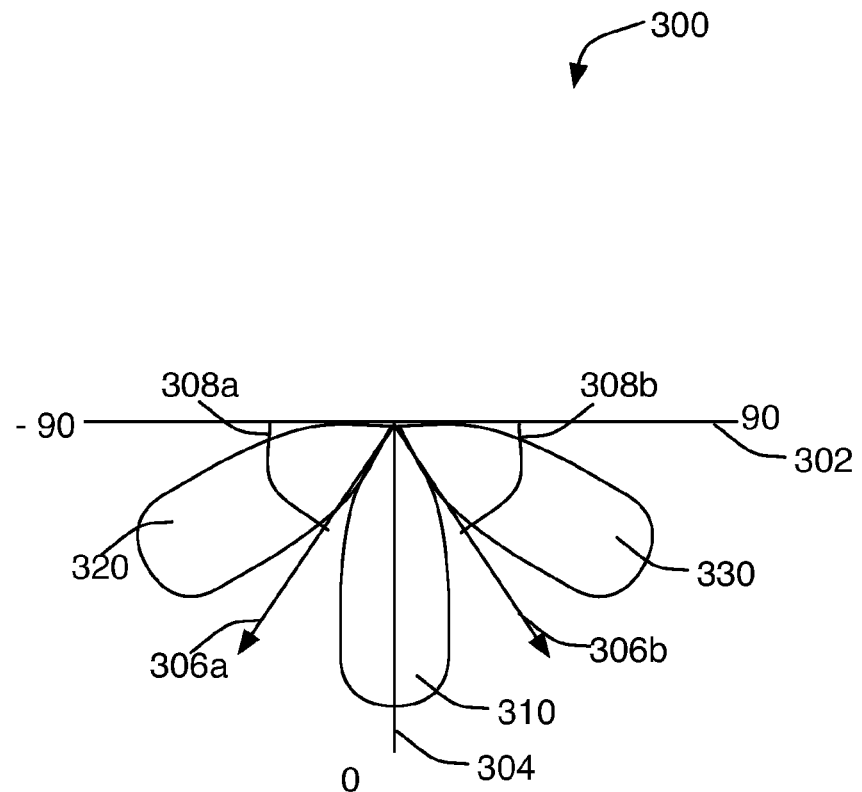
FIG. 3 is a diagram of a radiation pattern provided by a shaped LGA having an integrated CPC reflector in accordance with some embodiments of the invention.

To further improve the distribution of light by LGA 210, the LGA can include a surface corresponding to a CPC reflector in some regions of the LGA. FIG. 3 is a diagram of a radiation pattern provided by a shaped LGA having an integrated CPC reflector in accordance with some embodiments of the invention. Pattern 300 can include several lobes 310, 320 and 330 extending at different angles relative to axes 302 and 304, where axis 302 is within the plane of the LGA, and axis 304 is perpendicular to the plane of the LGA and directed towards the environment.

Center lobe 310 can extend substantially along axis 304 into the environment of the light fixture. In some cases, light corresponding to center lobe 310 can be provided by a primary surface of the LGA (e.g., a surface that does not correspond to a CPC reflector). Lobe 310 can correspond to any suitable type of radiation including, for example, Lambertian radiation generated by the LGA.

Side lobes 320 and 330 can extend at angles relative to axis 302. In particular, side lobe 320 can be defined such that side lobe 320 extends between axis 302 and cut-off axis 306a, which is angled at angle 308a relative to axis 302. Similarly, side lobe 330 can be defined such that side lobe 330 extends between axis 302 and cut-off axis 306b, which is angled at angle 308b relative to axis 302. Angles 308a and 308b can be the same or different, for example based on the environment in which the LGA is placed.

The particular angles 308a and 308b can be determined from attributes of CPC reflectors providing secondary surfaces reflecting LGA flux. Angles 308a and 308b can serve as cut-off angles changing the orientation at which the LGA illuminates an environment. In particular, the flux can be steered to elevations between axis 302 and cut-off axes 306a and 306b. This may improve the off-axis illumination of the LGA.

Figure 4A:
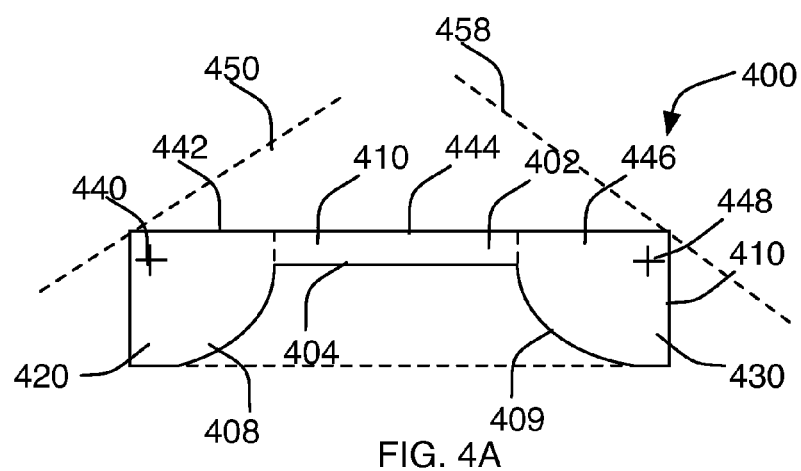
FIG. 4A is a sectional view of an illustrative LGA having a CPC reflector forming a secondary reflective surface in accordance with some embodiments of the invention.
Figure 4B:
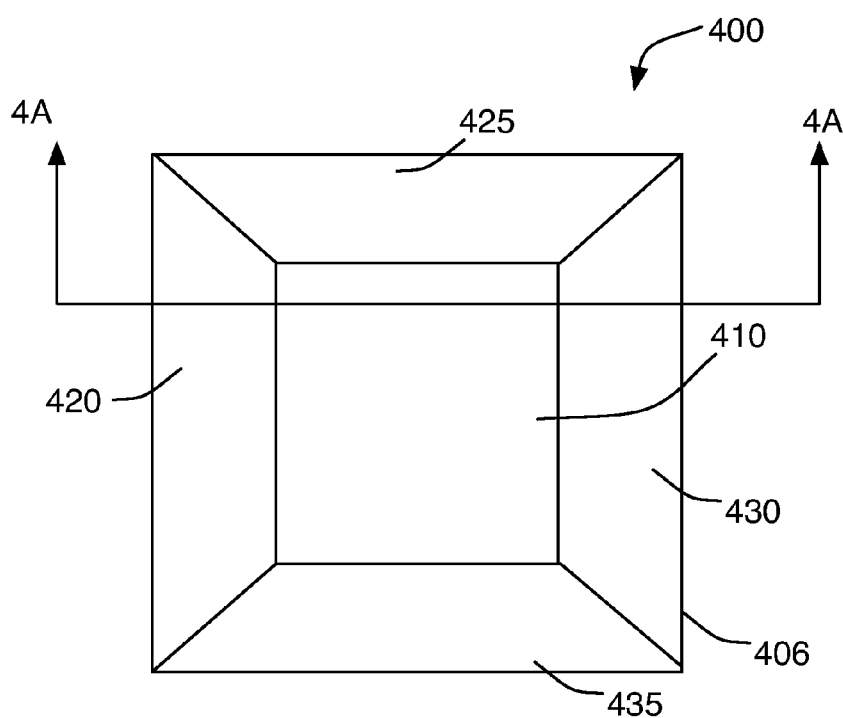
FIG. 4B is a top view of the illustrative LGA of FIG. 4A in accordance with some embodiments of the invention.

FIG. 4A is a sectional view of an illustrative LGA having a CPC reflector forming a secondary reflective surface in accordance with some embodiments of the invention. FIG. 4B is a top view of the illustrative LGA of FIG. 4A in accordance with some embodiments of the invention. LGA 400 can include base 402 having central section 410 defining primary surface 404 of the LGA. CPC reflectors 420, 425, 430 and 435 can be distributed around periphery 406 of base 402 (e.g., forming a closed loop of CPC reflectors). Each reflector can define a shape of a partial parabola angled relative to primary surface 404. The outer surface of each reflector can define a secondary reflective surface for redirecting a beam to off-axis elevations and azimuths, as determined from the angle of the reflector relative to a plane of the primary light source. In some cases, each reflector can instead replace a parabolic section with a hyperbolic section combined with a collimating lens.

The shape of each reflector can be defined by an origin (e.g., points 440 and 448), an axis (e.g., axes 450 and 458), and a width. The parabolas can be defined such that the origins fall within LGA 400, along an edge of LGA 400 (e.g., on periphery 406 or along an edge of LGA 400), or outside of LGA 400. In some cases, a reflector can be shaped such that the origin is at an edge or within the LGA. Using this approach, light frustrated at the origin (e.g., at point 440 or 448) can be directed substantially entirely by the CPC reflector (e.g., by reflector 420 or 430, respectively) at an off-axis elevation (e.g., corresponding to side lobes 320 and 330, FIG. 3).

Light frustrated in region 444 of LGA 400 between reflectors, for example frustrated at primary surface 404, can be directed in a direction substantially normal to primary surface 404 (e.g., corresponding to primary lobe 310, FIG. 3). Light frustrated by region 442 of LGA 400 that is between point 440 and region 444 can be partially reflected by secondary surface 408 corresponding to reflector 420, and the remainder transmitted without reflecting, contributing to node 310 in FIG. 3. Similarly, light frustrated by region 446 of LGA 400 that is between point 448 and region 444 can be partially reflected by secondary surface 409 corresponding to reflector 430 and the remainder transmitted with reflecting, contributing to node 310 in FIG. 3.

In effect, light emitted by portions of primary surface 404 that are underneath a reflector may be redirected by the secondary surface at an angle that is bound by a sharp cut-off at an angle or elevation corresponding to the CPC reflector. This approach may allow precise control of the flux and beam shaping for modest to extreme off-axis elevations and azimuths.

The size and position of the reflectors relative to the primary surface within the reflectors can be tuned for performance in a particular environment. For example, by extending the reflector in-board from the periphery of the LGA, more of the flux can be captured and redirected off-axis. Alternatively, if the reflector is moved out-board towards the periphery of the LGA, less flux may be captured by the reflector and the LGA may provide a more direct light along an axis of the LGA.

Figure 5A:
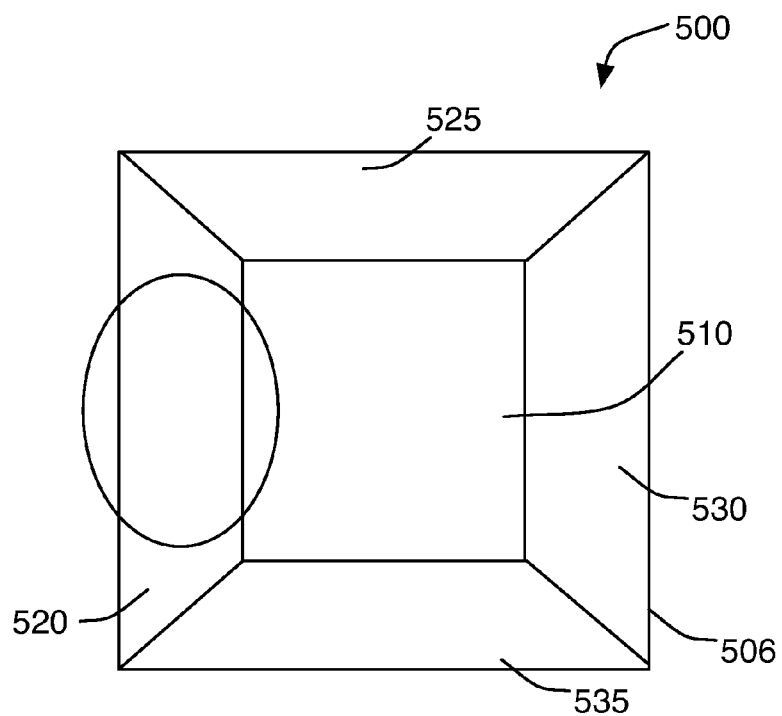
FIG. 5A is top view of an illustrative LGA in accordance with some embodiments of the invention.
Figure 5B:
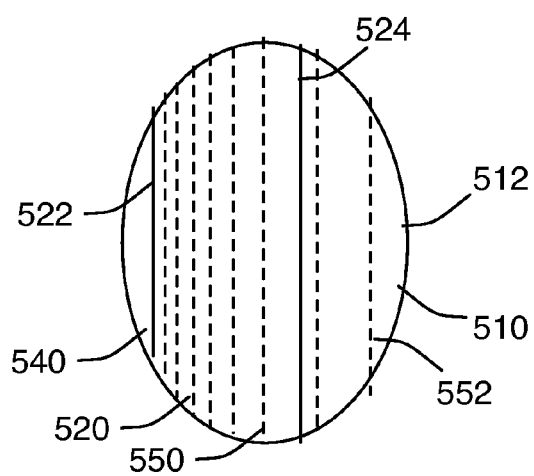
FIG. 5B is a detailed view of a portion of the LGA of FIG. 5A in accordance with some embodiments of the invention.

In some cases, the base or reflectors of LGA 400 can include internal features for frustrating light out of the LGA and into the environment. For example, the LGA can include several ribs distributed within the LGA at various intervals for frustrating light. FIG. 5A is top view of an illustrative LGA in accordance with some embodiments of the invention. FIG. 5B is a detailed view of a portion of the LGA of FIG. 5A in accordance with some embodiments of the invention. LGA 500 can include base 510 and CPC reflectors 520, 525, 530 and 535 disposed around periphery 506 of LGA 500. Portion 540 of LGA 500, shown in FIG. 5B, can include a portion of reflector 520 and a portion of base 510.

Each of reflector 520 and base 510 can include features for frustrating light emitted by a light source. In the example of FIG. 5B, the features can correspond to ribs extending along a length of reflector 520 and base 510. For example, reflector 520 can include ribs 550, and base 510 can include ribs 552. Based on the frequency or density of ribs, the amount of light frustrated by each portion of LGA 500 can vary.

To control the amount of light provided by each of reflector 520 and base 510, the number or density of ribs in each portion can be tuned. For example, ribs 550 and ribs 552 can be distributed at intervals varied to provide similar light outputs by each of reflector 520 and base 510. As another example, ribs 550 and ribs 552 can be distributed at different intervals (e.g., such that ribs 550 are closer to each other than ribs 552, or vice versa) to direct more or less light out of reflector 520 relative to base 510. In some cases, the space between adjacent ribs in one or both of base 510 and reflector 520 can vary. In the example of LGA 500, the distance between ribs 550 may increase from outer boundary 522 of reflector 520 towards interface 524 between reflector 520 and base 510. In addition, the distance between ribs 522 in base 510 can increase from interface 524 towards a center of base 510. This approach can ensure that light is evenly distributed in each of the lobes depicted in light pattern 300 (FIG. 3).

A LGA having a curved surface and a CPC reflector can be constructed using different approaches. In some cases, different features of the LGA can be cut from a block of material (e.g., using a machining process). Alternatively, the LGA can be molded (e.g., injection molded, compression molded, or vaccum formed) with desired features. In some cases, one or more surfaces of the LGA can be processed to improve their reflectivity. For example, the surfaces of the LGA can be polished (e.g., using an abrasive tool).

The LGA can be constructed from any suitable material. In some cases, the material used can be selected such that the index of refraction between the material and air is approximately 1.5. Such materials can include, for example, an acrylic, polycarbonate, glass, or another plastic material that is substantially transparent.

Figure 6:
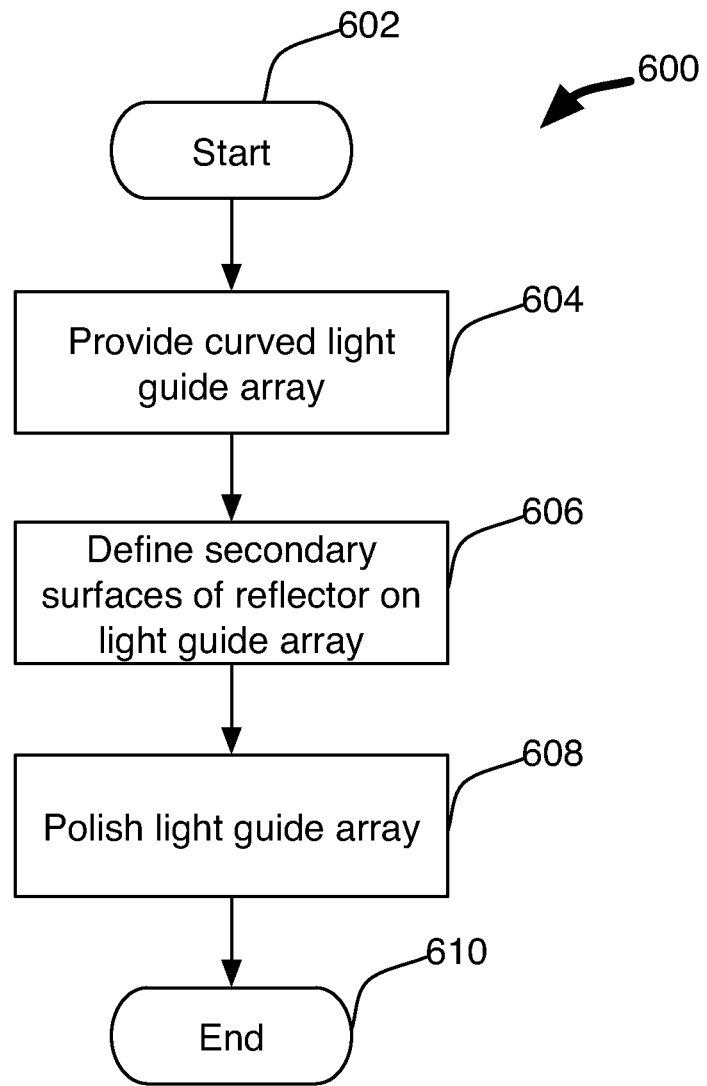
FIG. 6 is a flow chart of an illustrative process for constructing a light guide array having a CPC reflector in accordance with some embodiments of the invention.

FIG. 6 is a flow chart of an illustrative process for constructing a light guide array having a CPC reflector in accordance with some embodiments of the invention. Process 600 can begin at step 602. At step 604, a shaped light guide array can be provided. For example, an optically transparent material can be retrieved and shaped to fit in a light fixture. In some cases, the material can be provided substantially as a rectangular prism that includes a curved surface. At step 606, a secondary surface corresponding to a reflector can be defined on the light guide array. For example, a parabolic shape corresponding to a CPC reflector can be defined in the LGA, where the axis of the parabolic shape can be selected to provide off-axis illumination using the light guide array. In some cases, material can be cut away from a base structure to form the secondary surface. The light guide array can include any suitable number of secondary surfaces corresponding to reflectors including, for example, four secondary surfaces corresponding to four reflectors positioned around four sides of the LGA. At step 608, the light guide array can be polished to improve the reflectivity of the light guide array. Alternatively, a diffusive layer can be placed over one or both of the primary surface and the secondary surface. In some cases, other finishing processes can be applied to the LGA, or step 608 can be skipped. Process 600 can then end at step 610.

It is to be understood that the steps shown in process 600 of FIG. 6 are merely illustrative and that existing steps may be modified or omitted, additional steps may be added, and the order of certain steps may be altered. Insubstantial changes from the claimed subject matter as viewed by a person with ordinary skill in the art, now known or later devised, are expressly contemplated as being equivalently within the scope of the claims. Therefore, obvious substitutions now or later known to one with ordinary skill in the art are defined to be within the scope of the defined elements.

The above-described embodiments of the invention are presented for purposes of illustration and not of limitation.

What is claimed is:

1. A method for constructing a light guide array for use with an edge-lit LED light fixture, comprising:
   providing a rectangular prism comprising a primary surface;
   providing a compound parabolic concentrator (CPC) reflector on one side of the periphery of the periphery of the rectangular prism, the reflector at an angle offset from the normal to the primary surface of the prism, the CPC reflector defining a closed loop around the periphery of the base structure; and
   a secondary surface of a first CPC reflector, and a third surface of a second CPC reflector, each positioned adjacent to the primary surface of the elongated light guide, and each capable of transmitting light when optically coupled to a light source.

2. The method of claim 1, wherein defining further comprises: defining a cut-off angle for the CPC reflector, wherein the cut-off angle is related to the angle offset from the normal at which light is directed by the CPC reflector.

3. The method of claim 2, wherein the light guide array is constructed from at least one of: acrylic; glass; and polycarbonate.

4. The method of claim 1, wherein defining further comprises: removing material from the prism to form the CPC reflector.

5. The method of claim 1, wherein defining further comprises: molding the light guide array with the primary surface and the CPC reflector.

6. The method of claim 1, further comprising: placing a LED module adjacent to an end of the rectangular prism.

7. A light guide array comprising a base structure, the base structure comprising:
   a rectangular prism comprising a primary surface, the rectangular prism define a base structure;
   a first compound parabolic concentrator (CPC) reflector located on one side of the periphery of the base structure, the first CPC reflector at an angle offset from the normal to the primary surface of the rectangular prism, the first CPC reflector; and a secondary surface of a first CPC reflector, and a third surface of a second CPC reflector, each positioned adjacent to the primary surface of the elongated light guide, and each capable of transmitting light when optically coupled to a light source.

8. The light guide array of claim 7, further comprising a plurality of ribs distributed within the base structure, wherein the ribs are operative to frustrate light received by the base structure and spaced to provide uniformly bright luminance, wherein the distribution of the plurality of ribs varies within the base structure.

9. The light guide array of claim 8, wherein: ribs adjacent to the secondary surface are more closely spaced than ribs adjacent to the primary surface.

10. The light guide array of claim 8, wherein: the distribution of the plurality of ribs varies within the CPC reflector.

11. A light guide comprising:
an elongated body comprising a primary surface through which light is emitted; and
a first compound parabolic concentrator (CPC) reflector located on one side of the periphery of the base structure the first CPC reflector at an angle offset from the normal to the primary surface of the rectangular prism, the first CPC reflector; and a secondary surface of a first CPC reflector, and a third surface of a second CPC reflector, each positioned adjacent to the primary surface of the elongated light guide, and each capable of transmitting light when optically coupled to a light source.

12. The light guide of claim 11, wherein at least one of first and second CPC reflectors is operative to direct light at a different angle than light emitted through the primary surface.

13. The light guide of claim 11, wherein light directed by the at least one of first and second CPC reflectors is directed at an angle less than a cut-off angle associated with that CPC reflector.

14. The light guide of claim 13, wherein the cut-off angle is determined from an orientation of the at least one of first and second CPC reflectors relative to a portion of the primary surface.

15. The light guide of claim 11, wherein at least one of the first and second CPC reflectors is operative to receive light at a fourth surface.

16. The light guide of claim 11, wherein the light emitted by the light guide forms a radiation pattern that comprises at least two distinct lobes.

17. The light guide of claim 16, wherein: a first lobe corresponds to light emitted by the primary surface; and a second lobe corresponds to light emitted by the secondary surface.

18. The light guide of claim 17, wherein the first lobe is angled substantially perpendicular to the primary surface.

19. The light guide of claim 11, wherein at least one of the secondary surface and third surface defines a partial parabola.

20. The light guide of claim 11, wherein the elongated body defines a spline.

* * * * *